Figure 2:
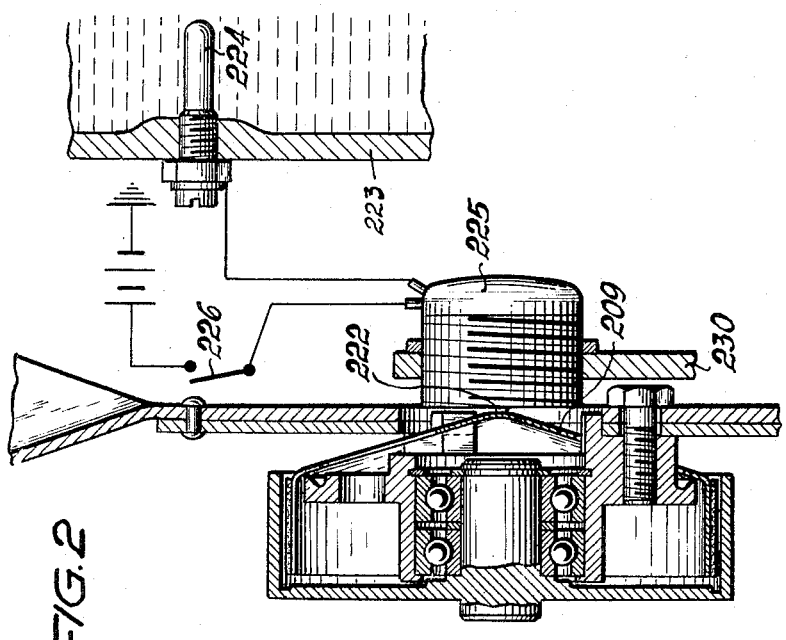

Feb. 14, 1967  S. MÖBIUS  3,304,000

FRICTION CLUTCH

Filed April 23, 1965  4 Sheets-Sheet 1

INVENTOR
Siegfried Möbius

INVENTOR
Siegfried Möbius
By
Richard Low
Ag'4

Feb. 14, 1967 S. MÖBIUS 3,304,000
FRICTION CLUTCH

Filed April 23, 1965 4 Sheets-Sheet 3

INVENTOR
Siegfried Möbius
By
Richard Low
Ag't

United States Patent Office 3,304,000
Patented Feb. 14, 1967

---

3,304,000
FRICTION CLUTCH
Siegfried Möbius, Schweinfurt (Main), Germany, assignor to Fichtel & Sachs A.G., Schweinfurt (Main), Germany, a corporation of Germany
Filed Apr. 23, 1965, Ser. No. 450,548
Claims priority, application Germany, Apr. 25, 1964,
F 42,720
12 Claims. (Cl. 236—35)

This invention relates to a friction clutch and more particularly to a heat-responsive friction clutch which is especially intended to operate a fan of water-cooled combustion engines.

The primary object of this invention is to generally improve heat-responsive friction clutches for the use with water-cooled combustion engines.

In a known clutch which is heat-responsive and is used for the operation of a fan in water-cooled combustion engines, a friction belt is provided on a clutch member which carries the fan. Acting on a lever that is supported in the axis of rotation and rotates with the clutch member in circumferential direction is a thermostat on one side and a return spring on the other side. An end portion of the lever, bent in axial direction, passes through an opening in the fan and engages another part which is connected with the friction belt. With the rise of temperature, the thermostat that is mounted behind the fan expands and causes rotation of the lever and thus actuation of the clutch. This construction has the disadvantage that the movement of the thermostat is transmitted to the friction belt over a number of intermediate parts, which reduces the dependability of the operation. A return spring is required for a positive engagement of thermostat and lever. Moreover, the thermostat, return spring and lever afford a strong imbalance, as the fan rotates, since the centers of gravity of these parts do not coincide with the axis of rotation and are unevenly distributed over the periphery.

One object of my invention is to overcome the disadvantages of intermediate parts between a thermostat and a friction-producing device, and of the imbalance caused by such parts.

Another known friction clutch which operates in response to the temperature of a cooler is likewise equipped with a friction belt. The latter is connected to a lever which projects through an opening of the fan and is slotted. A bimetallic coil engages the slot. A considerable drawback of this construction resides in the fact that both the bimetallic coil which is freely accessible and unprotected and the lever can readily be damaged, especially since the coil and lever, in the coupled condition of the clutch, participate in the rotation.

Another object of the present invention is to eliminate such drawbacks as are associated with the unprotected state of sensitive parts.

The use of a friction belt as in the aforesaid prior constructions is most disadvantageous due to the centrifugal forces which, in the coupled state, develop in conformity with the weight of the belt and the rate of rotation and act upon the belt. These forces act together with the clutch-actuating force to press the friction belt against the driving part of the clutch. Disengagement of the clutch at a high rate of speed is ensured with a light friction belt only, but such belt constitutes a friction belt of a very low stability as far as shape is concerned.

A further object of the invention is to do away with such means as will undesirably increase the primary clutch-actuating force.

To the accomplishment of the foregoing and such other objects as will appear hereinafter, my invention consists in the friction clutch elements and their relation one to the other, as are more particularly described in the specification and sought to be defined in the claims.

Broadly, my present invention provides a friction clutch which comprises first or driving clutch means having an axis and a friction face circumferentially extending about said axis. There are second or driven clutch means and at least a single resilient member. The latter is provided with a circumferential friction lining and is arranged and adjustable so as to have the friction lining move radially toward and from, and engage and disengage, the friction face. The clutch of the invention further includes means operatively connecting the resilient member and the second clutch means, heat-responsive means, and fan means. The heat-responsive means is mounted to act upon the resilient member and to cause the friction lining to engage the friction face or to disengage therefrom. The fan means is connected with the second clutch means for common rotation.

Figure 1:
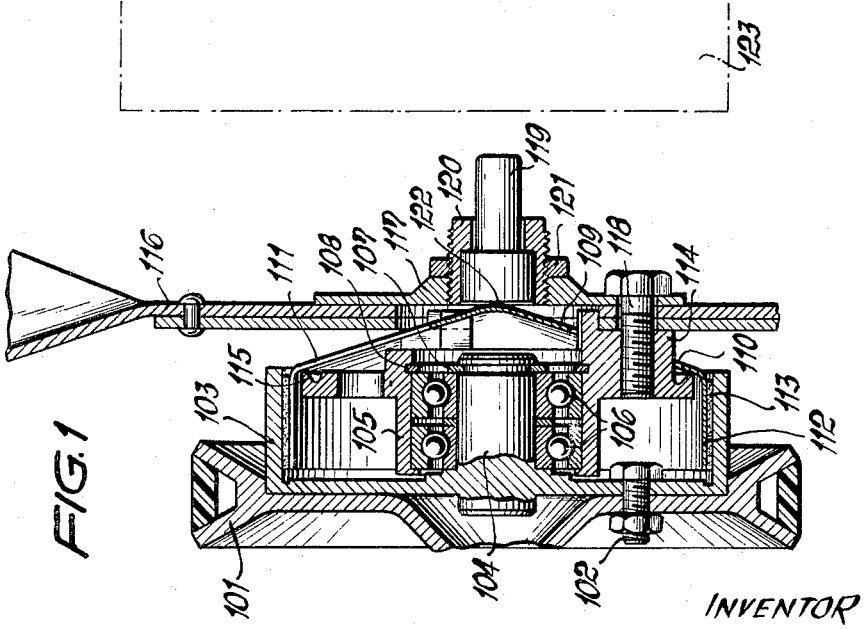
Figure 4:
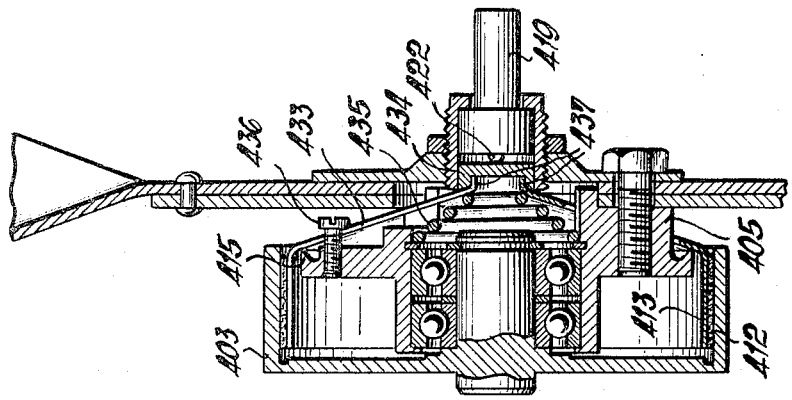
Figure 3:
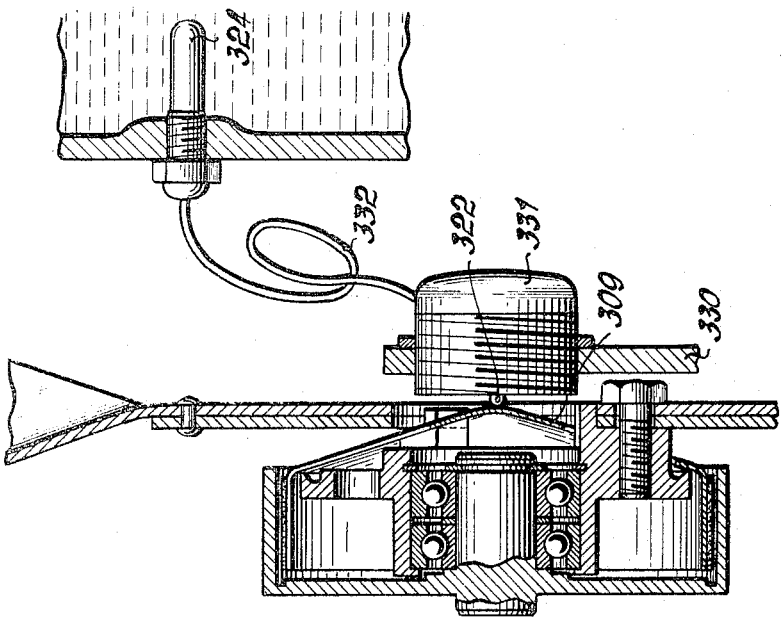
Figure 5:
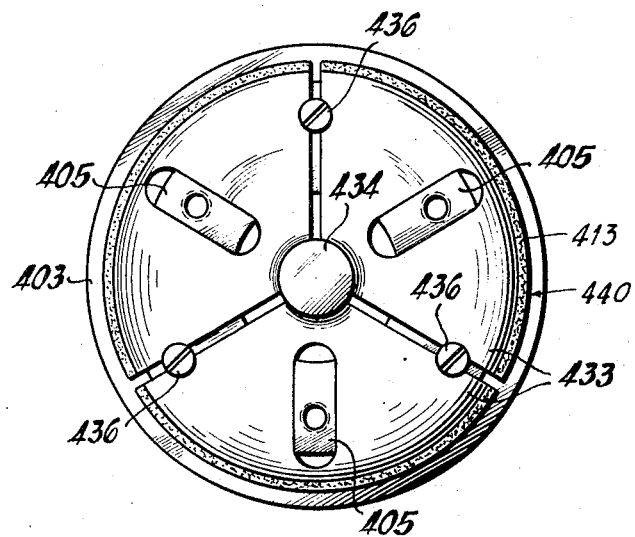
Figure 6:
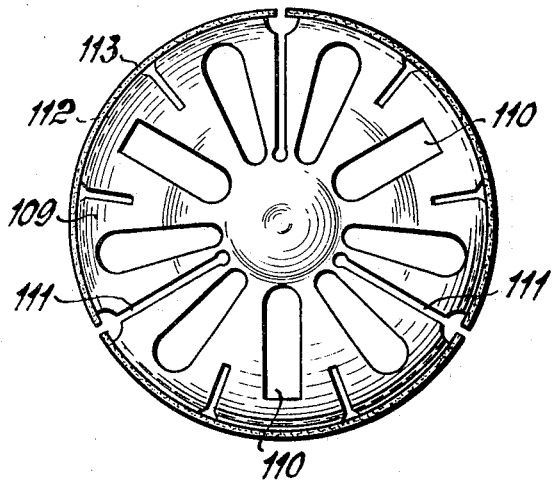
Figure 7:
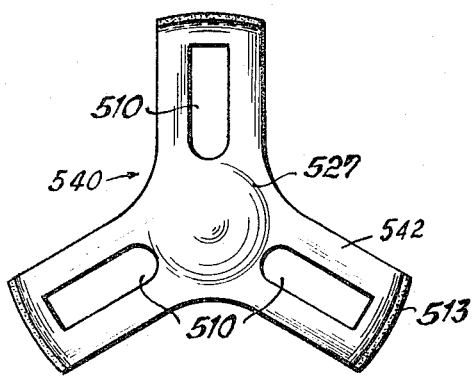
Figure 8:
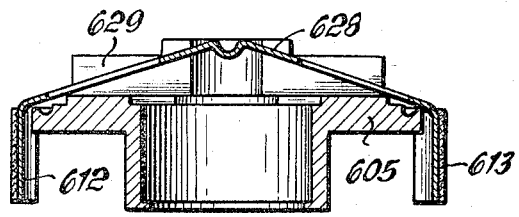
Figure 9:
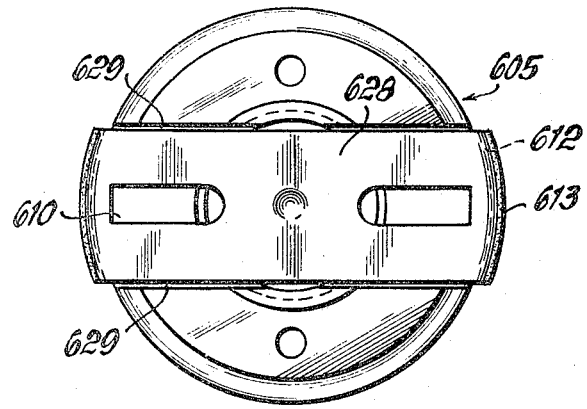

The specification is accompanied by drawings in which:
FIG. 1 is a sectioned elevation of a friction clutch embodying features of the invention;
FIG. 2 is a sectioned elevation of a modified clutch;
FIGS. 3 and 4 are sectional views of two more modifications;
FIG. 5 is a plan view of the clutch of FIG. 4, with some parts removed;
FIG. 6 illustrates parts of the clutches of FIGS. 1 to 3;
FIG. 7 shows modifications of the parts of FIG. 6;
FIG. 8 is a section through parts of the clutches of FIGS. 1 and 2 in modified form; and
FIG. 9 is a plan view of the parts of FIG. 8.

Referring to the drawings in greater detail now, and initially to FIG. 1, a V-belt pulley 101 serves as a driving member. A clutch bell 103, on the driving side of the clutch, is fastened to the pulley 101 by means of screws 102. The interior wall of the bell forms a friction face 102. Supported on a shaft 104 of the bell 103, by means of two ball bearings 106, is a part 105 on the driven side of the clutch. The ball bearings are secured against axial displacement by being held in place on the shaft 104 by a retaining ring 107, and on the clutch part 105 by a retaining ring 108. A slotted dish-shaped part 109 is provided with openings 110, slots 111, and a cylindrical extension 112 (see also FIG. 6). While the openings 110 are in the dish-shaped part 109 only, the slots are also provided in the extension 112 and extend in the extension in circumferentially spaced condition and parallel to the axis of the clutch. The extension 112 is provided with a friction lining 113 which is divided by the slots 111. FIG. 6 shows three such slots and a division of the friction lining into three parts. The clutch part 105 is provided with retainers 114 and an annular abutment 115. A fan 116 and a flange 117 are connected to the clutch part 105 with the aid of screws 118. Seated in an adjustment sleeve 120 which is screwed into the flange 117 and secured in place by a nut 121 is a thermo-pin 119. The thermo-pin acts upon the dish 109, at the center thereof, over a small bolt 122 which serves as an adjusting member. The dish 109 and extension 112 form an integral hollow and deformable resilient part and will be referred to hereinafter as a resilient member or body, and similarly functioning parts will likewise be called resilient members or bodies.

The heat-responsive clutch of FIG. 2 differs from the one shown in FIG. 1 by an adjustment device other than that of the construction of FIG. 1. In FIG. 2 there is shown a feeler 224 which immerses in cooling water held in a container 223 and acts on an electromagnet 225 devised as an adjusting device. The electromagnet is shown to be mounted on a stationary bracket 230 which may be secured to the motor.

The adjusting device shown in FIG. 3 includes a pressure box 331 which is supported by a stationary bracket 330 and is connected with a feeler 324 by a capillary tube 332. The feeler 324 is immersed in cooling water.

In the modification of FIGS. 4 and 5, the one-piece resilient member of FIG. 1 appears replaced by three parts. The three sectors 433 when taken together form a whole similar in over-all shape to the dish 109, and generally designated 440. The resilient member of FIGS. 4 and 5 is used together with a return spring 435. End portions or rims 437 of the sectors 433 are received within an axially displaceable member or slide 434 which is acted upon by a small bolt 422 and a thermo-pin 419. Abutment screws 436 for the sectors 433 are secured to a clutch part 415.

FIG. 7 shows a resilient body 540 which takes the place of the resilient body 109, 112 of FIG. 1. The body 540 consists of three arms 542 which extend radially outwardly from a central point. Each of the arms carries on its peripheral outer edge an extension provided with a friction lining 513. When viewed edgewise, the arms 542 are dish-shaped.

FIGS. 8 and 9 show a clutch part 605 and a leaf spring 628 which serves as the resilient body in this case. The leaf spring is received in a diametrically extending groove 629 in the clutch part 605 and rests on abutment 610. At its peripheral ends, the leaf spring is provided with extensions 612 which, in turn, are provided with friction linings 613.

The operation of the clutch of the invention is as follows:

In the embodiment shown in FIG. 1, the thermo-pin 119 is in proximity of the water cooler 123. The temperature of the air surrounding the thermo-pin rises or drops in keeping with the temperature of the water in the cooler 123. Under the influence of a rising temperature, the thermo-pin expands and presses against the center of the dish 109 by means of the small bolt 122. The dish 109 of the deformable resilient body 109, 122 bears against the annular abutment 115. It is especially the dish 109 of the resilient body, which is deformable. The retainers 118 of the clutch part 105 enter the openings 110 of the dish 109 and thus operatively connect dish 109 and clutch part 105. Also fixedly connected with the clutch part 105 are the fan 116 and flange 117. When the thermo-pin 119 is heated to a certain point the axial movement of the bolt 122 becomes large enough to cause compression of the dish 109 which, as has been stated, abuts against the annular abutment 115, and due to this tangential support a diametrical enlargement of the cylindrical extension 112 takes place. This enlargement is adequate to make the extension 112 press against the cylindrical inner wall of the clutch bell 103. The fan 116 is actuated.

As the speed of rotation of the fan increases, there is also an increase in the centrifugal force developed by the extension 112, which enhances the compressing action of the thermo-pin 119 upon the dish 109. The joint effect of the actuating force of the thermo-pin 119 and of the referred to centrifugal force brings about a quick coupling, which greatly reduces wear and accordingly increases the useful life of the clutch.

With the clutch in gear, the fan effects intensive cooling of the cooling water. If the temperature of the cooling water drops below a predetermined value, the temperature of the air around the thermo-pin or between the cooler 123 and the thermo-pin 119 will also drop and the bolt 122 will retract and disengage from the dish 109. Its tension being released, the dish 109 assumes its normal shape, and the cylindrical friction lining 113 recedes from the friction surface on the cylindrical inner wall of the clutch bell 103. The fan becomes separated from the drive.

The desired temperature at which the clutch is to be thrown in gear to operate the fan can easily be set by turning the adjustment sleeve 120 in the flange 117. Such adjustment makes it also readily possible to compensate wear of the friction face and lining such as occurs after prolonged use.

As for the embodiment of FIG. 2, the feeler 224 immersing in cooling water is provided with contacts which close a circuit when a switch 226 is closed and a given cooling water temperature is exceeded. The switch 226 may be connected, for instance, with the ignition switch. Closing of the circuit causes the electromagnet 225 to respond and to press the bolt 222 against the dish 209. The further operation of the clutch is the same as has been described hereinbefore with respect to FIG. 1. When the temperature of the cooling water drops below a predetermined point, the feeler breaks the circuit, the bolt 222 moves back, and the fan is uncoupled.

In the embodiment shown in FIG. 3, the axial movement of the small bolt 322 is effected by changes in the volume and pressure of any suitable pressure medium, such as compressed air, within the feeler 324. Such changes take place in accordance with changes in the cooling water temperature. Any change in volume and pressure of the medium within the feeler is communicated through the capillary tube 332 to the pressure box 331 and also to the bolt 322, and the latter acts on the dish 309, as has been explained before. Both coupling and uncoupling are the same as in the case of the construction of FIG. 1. A special pressure bearing may be mounted between the bolt 322 and the rotating dish 309.

In the construction of FIGS. 4 and 5, the small bolt 422 of the thermo-pin 419 acts on the slide 434. A rise in temperature leads to an axial movement of the slide 434 against the force of the return spring 435. This axial movement produces simultaneously axial displacement and a swinging action of the sectors 433. The swinging takes place about the parts 415 as fulcra.

In the case of the embodiments shown in FIGS. 7, 8 and 9, the three-armed member 527 and the leaf spring 628 behave as the resilient member 109, 112 of the construction of FIG. 1.

It is believed that my invention in general as well as the construction and operation of the forms for practicing the invention, as shown, and the many advantages thereof, will be fully understood from the foregoing detailed description. Some of the features and advantages of the invention are reviewed and pointed out hereinafter.

Heat-responsive means which may be used in different forms act upon what is being referred to as a resilient member. The resilient member when acted upon becomes deformed, and a part of the resilient member which is provided with a friction lining and constitutes a driven part of the clutch engages a friction face of a driving member of the clutch. When the action on the resilient member by the heat-responsive device ceases the resilient member resumes its normal shape, released of any tension. The resilient member of FIGS. 1 to 3 and 6 constitutes an integral hollow body. The resilient member of FIGS. 4 and 5 is shown to consist of three separate parts which, however, together also form a hollow body. The resilient member of FIG. 7 and of FIGS. 8 and 9 is a three-armed and two-armed body, respectively.

The resilient member of FIGS. 1 to 3 and 6 consists of a cylindrical portion and another portion which tapers to an apex in the axis of the clutch. The cylindrical portion is coaxial with the clutch. It is the apex of the cone-shaped portion of the resilient member, upon which pressure on the part of the heat-responsive device is exerted, and which, on such pressure, is urged inwardly of the body.

Generally, the resilient member includes a part which is cone-shaped or dish-shaped and is mostly referred to herein as a dish. Where the resilient member has more than a single part to take the place of the cone-shaped part, such plurality of parts, too, are cone or dish-shaped.

Due to the inherent resiliency of the resilient member, no return springs are used in the embodiments shown, except the embodiment of FIGS. 4 and 5. In the latter embodiment, a return spring is used because the resilient member consists actually of three parts.

It will be appreciated that the friction lining need not be necessarily provided on a driven part of the clutch. It may be on a driving part as well so that a surface of the driven part would constitute the cooperating friction surface.

It will be apparent that while I have shown and described my invention in a few forms only many changes and modifications may be made without departing from the spirit of the invention defined in the following claims.

I claim:
1. Friction clutch comprising
    (a) first or driving clutch means having an axis and a friction face circumferentially extending about said axis,
    (b) second or driven clutch means,
    (c) at least a single resilient member constituted by a hollow and deformable body having a side wall, a longitudinal portion of said side wall extending circumferentially about said axis and being provided with a circumferential friction lining, another portion of said side wall tapering to an apex in said axis, said apex being axially movable so as to have said friction lining move radially toward and from, and engage and disengage, said friction face,
    (d) means operatively connecting said resilient member and said second clutch means,
    (e) heat-responsive means mounted to act upon said apex of the resilient member and to cause said friction lining to effect said engagement and disengagement, and
    (f) fan means connected with said second clutch means for common rotation.
2. In the clutch according to claim 1, said first clutch means having a cylindrical interior wall.
3. In the clutch according to claim 2, said cylindrical interior wall forming said friction face.
4. In the clutch according to claim 1, a ring-shaped part mounted to abut tangentially against said tapering wall portion, and causing said longitudinal wall portion to move in a radial outward direction when said heat-responsive means urges said apex inwardly of said body.
5. In the clutch according to claim 1, said body being slotted, said slots being formed in said longitudinal wall portion to extend in a circumferentially spaced condition and parallel to said axis, and in said tapering wall portion to terminate partway between said longitudinal wall portion and said apex, said body thus being partly sectioned, the longitudinal part of each section being provided with a separate friction lining.
6. In the clutch according to claim 1, said first clutch means being formed as a cylindrical bell, a shaft centrally supported within said bell, said second clutch means being mounted on said shaft.
7. In the clutch according to claim 1, said heat-responsive means including a thermo-pin, said thermo-pin being arranged to act upon said apex of the resilient member.
8. In the clutch according to claim 1, a water cooler for a water-cooled combustion engine, said water cooler being cooled by said fan means, said heat-responsive means including a feeler immersed in the cooling water, and an electromagnet, the feeler being adapted to energize said electromagnet and to cause action upon said resilient member.
9. In the clutch according to claim 1, a water cooler for a water-cooled combustion engine, said water cooler being cooled by said fan means, said heat-responsive means including a feeler immersed in the cooling water, a pressure box, and a capillary tube connecting said feeler and said pressure box, the feeler being adapted to hold a pressure medium and to cause, over said pressure box, action upon said resilient member.
10. Friction clutch comprising:
    (a) first or driving clutch means having an axis and a friction face circumferentially extending about said axis;
    (b) second or driven clutch means;
    (c) a plurality of resilient members jointly constituting a hollow and deformable body and having respective longitudinally extending and generally sectorlike portions,
        (1) said sectorlike portions jointly forming a conelike formation tapering toward a central or apexlike point,
        (2) each sectorlike portion having an inner edge portion and an outer edge portion,
        (3) said outer edge portions extending circumferentially about said axis;
    (d) a friction lining extending circumferentially on each outer edge portion radially opposite said friction face;
    (e) means operatively connecting said resilient member and said second clutch means for joint movement about said axis;
    (f) heat responsive means mounted to act on said inner edge portions and for thereby moving said friction linings radially toward and away from a position of engagement with said friction face; and
    (g) fan means connected with said second clutch means for common rotation.
11. In the clutch according to claim 10, said heat responsive means including an axially displaceable slide centrally of the clutch, the inner edge of each of said sectorlike portions being provided with a bent rim, the bent rims being received in said slide in a circumferential sequence.
12. Friction clutch comprising:
    (a) first or driving clutch means having an axis and a friction face circumferentially extending about said axis;
    (b) second or driven clutch means;
    (c) a resilient member constituted by a deformable body having arm portions radially outwardly extending from a central apex portion of said body in said axis, said arm portions tapering in a conical fashion toward said apex portion,
        (1) a terminal face of each arm portion remote from said apex portion extending axially and circumferentially about said axis radially opposite said friction face;
    (d) a friction lining on each of said terminal faces;
    (e) heat-responsive means mounted to act upon said apex portion and to thereby cause said friction linings to move radially toward and away from a position of engagement with said friction face;
    (f) fan means; and
    (g) means operatively connecting said resilient member, said fan means, and said second clutch means for common rotation about said axis.

References Cited by the Examiner
UNITED STATES PATENTS

| | | | |
|---|---|---|---|
| 2,214,391 | 9/1940 | Weydell. | |
| 2,723,738 | 11/1955 | Pesek | 123—41.12 X |
| 2,740,388 | 4/1956 | Bennorth | 123—41.12 |
| 2,811,956 | 11/1957 | Lauck. | |

EDWARD J. MICHAEL, *Primary Examiner.*